(12) United States Patent
Schaad et al.

(10) Patent No.: US 11,671,028 B2
(45) Date of Patent: Jun. 6, 2023

(54) AC-TO-AC MMC WITH REDUCED NUMBER OF CONVERTER ARMS

(71) Applicant: Hitachi Energy Switzerland AG, Baden (CH)

(72) Inventors: Thomas Schaad, Oberbipp (CH); Michail Vasiladiotis, Zurich (CH); Jan Svensson, Västerås (SE); Georgios Stamatiou, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/627,752

(22) PCT Filed: Jul. 19, 2019

(86) PCT No.: PCT/EP2019/069556
§ 371 (c)(1),
(2) Date: Jan. 17, 2022

(87) PCT Pub. No.: WO2021/013319
PCT Pub. Date: Jan. 28, 2021

(65) Prior Publication Data
US 2022/0263422 A1     Aug. 18, 2022

(51) Int. Cl.
*H02M 5/293* (2006.01)
*H02M 7/483* (2007.01)
(Continued)

(52) U.S. Cl.
CPC ........... *H02M 5/293* (2013.01); *H02M 5/271* (2013.01); *H02M 5/297* (2013.01); *H02M 7/4835* (2021.05)

(58) Field of Classification Search
CPC ...... H02M 5/271; H02M 5/293; H02M 5/297; H02M 7/4835
See application file for complete search history.

(56) References Cited

U.S. PATENT DOCUMENTS 10,855,201 B1 * 12/2020 Noman ............... H02M 7/4835
2012/0026767 A1 * 2/2012 Inoue .................... H02M 7/217
363/78

(Continued)

OTHER PUBLICATIONS

Baruschka, Lennart, et al., "A New 3-Phase Direct Modular Multilevel Converter", Proceedings of the 14th European Conference on Power Electronics and Applications, Birmingham, UK, Aug. 30-Sep. 1, 2011, 10 pages.

(Continued)

*Primary Examiner* — Jue Zhang
(74) *Attorney, Agent, or Firm* — Slater Matsil, LLP

(57) ABSTRACT

An AC-to-AC modular multilevel converter (MMC) is configured to be connected between a three-phase AC system and a single-phase AC system. The MMC includes a number of converter arms connected in a ring to allow a circulating current to be circulated in the ring through each of the converter arms. Each converter arm includes series-connected converter cells. Phase terminals are arranged in the ring between the converter arms such that each of the converter arms is separated from neighboring converter arms by at least one of the phase terminals. The phase terminals include respective terminals for each of a first phase, a second phase and a third phase of the three-phase AC system and respective terminals for each of a positive conductor and a negative conductor of the single-phase AC system.

21 Claims, 4 Drawing Sheets

(51) Int. Cl.
H02M 5/27 (2006.01)
H02M 5/297 (2006.01)

(56) References Cited

U.S. PATENT DOCUMENTS

2018/0166994 A1* 6/2018 Dorn .................. H02M 1/32
2020/0235675 A1* 7/2020 Dallmer-Zerbe ... H02M 7/4835

OTHER PUBLICATIONS

Lei, Ming, et al., "A Sept-Branch Modular Multilevel Converter for Three-Phase to Single-Phase Direct AC/AC Equal Frequency Conversion", 43rd Annual Conference of the IEEE Industrial Electronics Society, Oct. 1, 2017, 6 pages.

Lei, Ming, et al., "Exploration of a Modular Multilevel Converter for Direct AC-AC Conversion", 2018 IEEE International Power Electronics and Application Conference and Exposition (PEAC), Shenzhen, China, Nov. 4-7, 2018, 6 pages.

Xu, Qianming, et al., "Analysis and Comparison of Modular Railway Power Conditioner for High-Speed Railway Traction System", IEEE Transactions on Power Electronics, vol. 32, No. 8, Aug. 2017, pp. 6031-6048.

* cited by examiner

AC-TO-AC MMC WITH REDUCED NUMBER OF CONVERTER ARMS

CROSS-REFERENCE TO RELATED APPLICATIONS

This application is a national stage application of International Application No. PCT/EP2019/069556, filed on Jul. 19, 2019, which application is hereby incorporated herein by reference.

TECHNICAL FIELD

The present disclosure relates to an MMC connected between a three-phase AC system and a single-phase AC system.

BACKGROUND (MMCs) are used for medium voltage (MV) and high-voltage (HV) converter applications. An MMC comprises converter arms of series-connected (also called cascaded) converter cells, each cell comprising an energy storage (typically capacitor) and a plurality of semiconductor valves forming a full-bridge (also called H-bridge or bi-polar) or half-bridge (also called unipolar) topology of the cell.

A direct converter in a double-star (also called double-Y or double-wye) topology is illustrated in FIG. 1A, which is, e.g., used in a railway intertie for three-phase alternating current (AC), 3AC, to single-phase AC (1AC) conversion, e.g., 3AC 50 Hz to 1AC 16.7 Hz (or 60 Hz-to-25 Hz) conversion, for low-frequency catenary systems, but is not the most appropriate solution when the input and the output frequencies are equal, e.g., 50 Hz-to-50 Hz. An alternative can be an indirect conversion through a direct current (DC) link in accordance with FIG. 1B, where an intermediate conversion step decouples the two AC systems and allows trouble-free conversion between any input and output frequency.

A problem with the known MMC topologies of FIGS. 1A and 1B is their cost, primarily allocated on their costly modular arms. The direct converter of FIG. 1A requires the use of six converter arms that equals three phase-legs (one phase-leg consists of two converter arms: one upper converter arm and one lower converter arm). Furthermore, the indirect converter of FIG. 1B requires the use of ten converter arms that equals five phase-legs, significantly increasing the overall cost. As a result, the possible reduction in converter arms while maintaining the overall performance, may be important in reducing the overall cost of the converters and present new techno-economically optimal topologies.

For instance, the increased electrification of railway locomotives worldwide has been a driving force for the development and installation of efficient power-electronic converters for handling the railway power supply. In many cases, other than a typical three-phase supply, locomotives require single-phase voltage supply, of the same or different frequency than the main three-phase grid. Specialized power-electronic topologies are thus employed to perform the necessary voltage/power transformation between the main grid and the railway supply system, that are supposed to be decoupled from each other.

SUMMARY

Embodiments of the present invention can provide an AC-to-AC MMC with reduced complexity and cost.

According to an aspect of the present invention, an AC-to-AC MMC is connected between a three-phase AC system and a single-phase AC system. The MMC comprises at least four converter arms connected in a ring to allow a circulating current to be circulated in the ring through each of the at least four converter arms. Each arm comprises a plurality of series-connected converter cells. The MMC also comprises phase terminals arranged in the ring, between the at least four converter arms such that each of the at least four converter arms is to either side in the ring separated from neighboring converter arms by at least one of the phase terminals. The phase terminals comprise respective terminals for each of the three phases of the three-phase AC system and respective terminals for each of the positive and negative conductors of the single-phase AC system.

According to another aspect of the present invention, there is provided an MMC arrangement comprising an embodiment of the MMC of the present disclosure, connected between the three-phase and single-phase AC systems, as well as a first power transformer via which the three-phase AC system is connected to the MMC.

By arranging the converter arms in a ring, a direct three-to-single phase converter is obtained, with a reduced number of converter arms to reduce cost and complexity of the MMC topology. In order to balance the DC capacitor voltages of the converter cells in the converter arms, a current $I_o$ of specific frequency and phase is circulated in the ring formed by the converter arms, through each arm of series connected converter cells.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION OF ILLUSTRATIVE EMBODIMENTS

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1A:
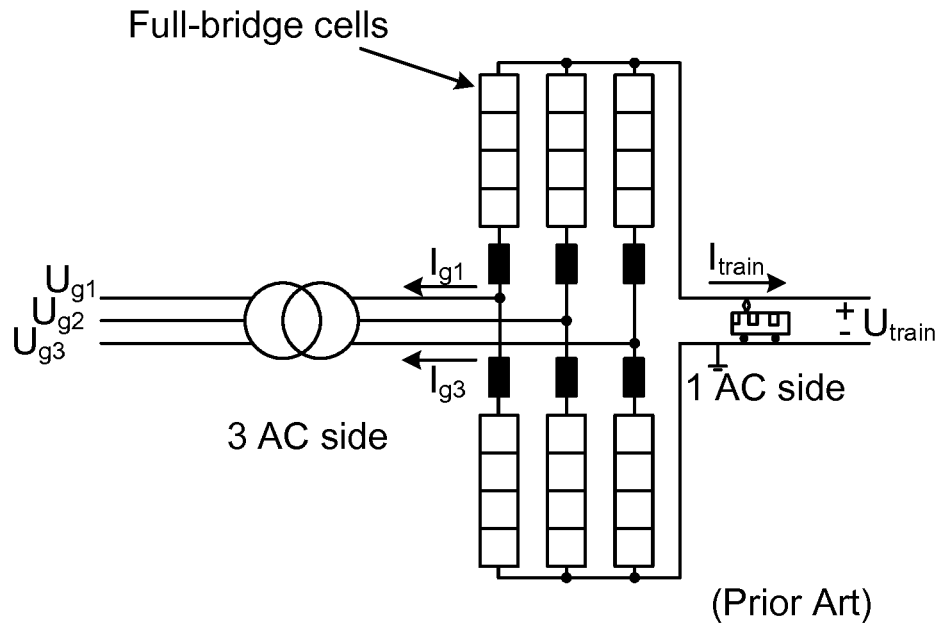
FIGS. 1A and 1B are schematic illustrations of different MMC topologies of the prior art.
Figure 1B:
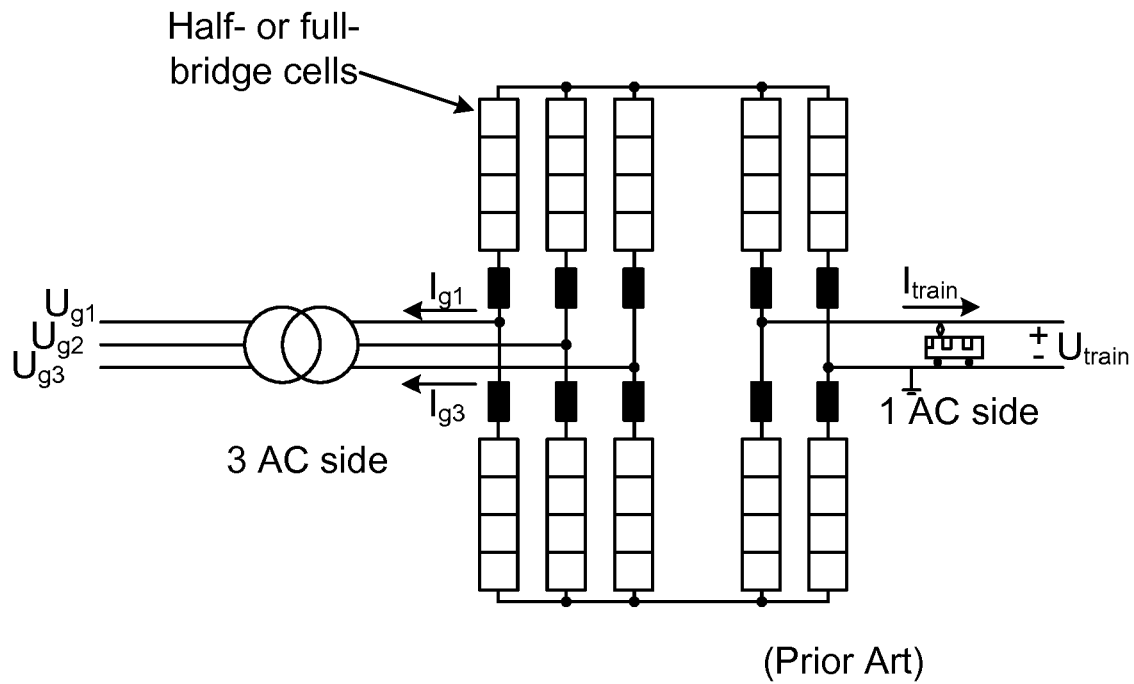
Figure 2A:
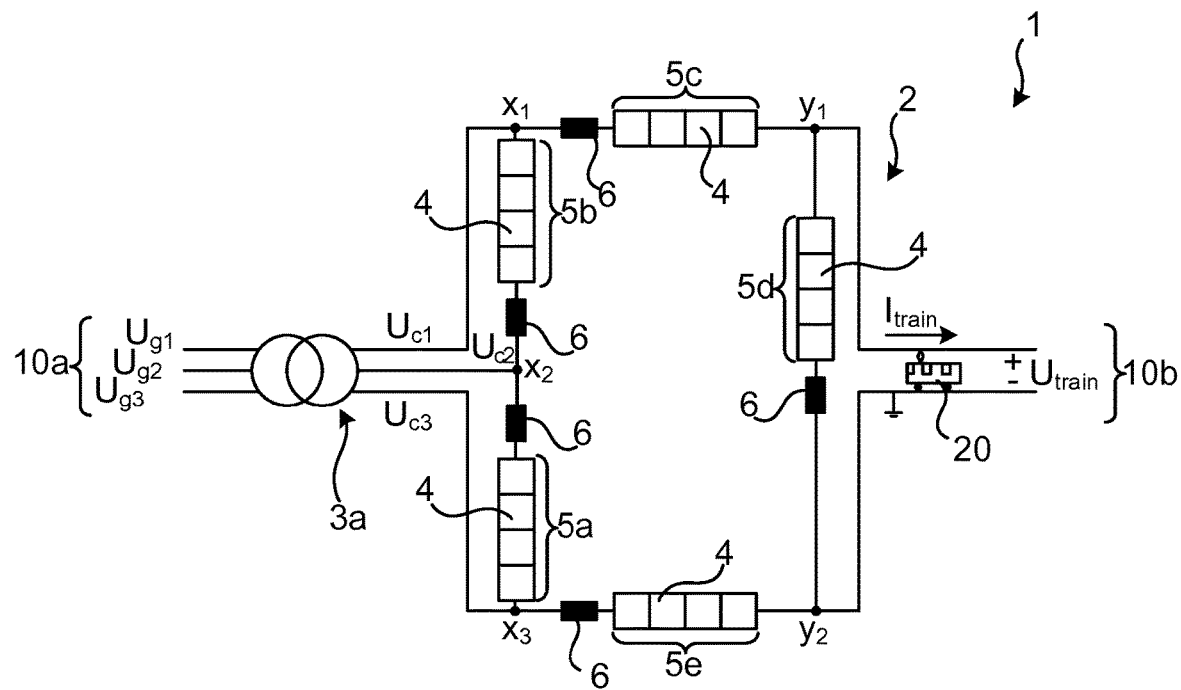
FIG. 2A is a schematic circuit diagram of an MMC topology for a three-phase to single-phase converter, in accordance with some embodiments of the present invention.

FIG. 2A illustrates an MMC arrangement 1 comprising an AC-to-AC MMC 2. The MMC 2 is a three-phase to single-phase converter connected between a three-phase AC system 10a, e.g., a distribution grid, and a single-phase AC system 10b, e.g., a railway grid for powering at least one train 20. In the embodiment illustrated in FIG. 2A, the single-phase system 10b is grounded and connected directly to the MMC 2, i.e. not via a transformer. On the three-phase side, on the other hand, the MMC 2 is connected to the three-phase system 10a via a first transformer 3a, e.g., a standard three-phase type, V-V type or Scott transformer.

Looking at the three-phase side of the MMC 2, the three-phase system 10a comprises a first phase having a grid-side voltage $U_{g1}$, a second phase having a grid-side voltage $U_{g2}$ and a third phase having a grid-side voltage $U_{g3}$ on the grid-side (primary side) of the first transformer 3a, resulting in converter-side voltages $U_{c1}$, $U_{c2}$ and $U_{c3}$ on the converter-side (secondary side) of the first transformer 3a. Each of the first, second and third phases of the three-phase system 10a connects, on the converter-side of the first transformer 3a, to respective first, second and third phase terminals $x_1$, $x_2$ and $x_3$ in the MMC 2.

Looking at the single-phase side of the MMC 2, the single phase system 10b has a single-phase voltage $U_{train}$ and current $I_{train}$, e.g., of a railway grid. The single-phase voltage $U_{train}$ is between a positive conductor and a negative conductor of the single-phase system 10b. The positive conductor is connected to a positive phase terminal $y_1$ of the MMC 2, and the negative conductor is connected to a negative phase terminal $y_2$ of the MMC. It should be noted that the polarity of the single-phase system 10b may be reversed to what is shown in FIG. 2A, resulting in the positive and negative phase terminals $y_1$ and $y_2$ changing places with each other. As illustrated in FIG. 2A, the single-phase system 10b may be grounded, facilitating connecting the single-phase system 10b directly to the MMC 2 without the need for a transformer there between.

The converter 2 a plurality of at least four converter arms 5 connected in a ring for allowing a current to be circulated through all of the converter arms 5 in said ring. That the converter arms are forming a ring implies that each arm 5 of the at least four arms is connected in the ring with two neighboring arms of the at least four arms connected to it, one neighboring arm to either side of the arm. Each converter arm 5 comprises a plurality of series connected (also called cascaded) converter cells 4, preferably full-bridge (also called bi-polar or H-bridge) converter cells but in some embodiments some or all cells 4 of one, some or all arms 5 may be half-bridge (mono-polar) cells. For instance, arms 5d, 5e and 5c could comprise or consist of half-bridge cells, while arms 5a and 5b would consist of full-bridge cells. A respective phase reactor 6 may be connected in the ring at and in series with each arm 5. The three-phase phase terminals $x_1$, $x_2$ and $x_3$ and the single-phase phase terminals $y_1$ and $y_2$ are also comprised in the ring, connected in the ring such that each of the at least four converter arms 5 is to either side in the ring separated from its neighboring converter arms by at least one of the phase terminals, i.e. between each two neighboring arms 5 in the ring there is at least one of the phase terminals arranged.

In the embodiment of FIG. 2A, the at least four converter arms of the MMC 2 consist of five converter arms 5a, 5b, 5c, 5d and 5e. Below, the sequence in the ring formed by the converter arms and phase terminals of the embodiment of FIG. 2A is given in a clockwise direction starting from the third phase terminal $x_3$. However, it should be noted that if the same embodiment is seen from the opposite direction, the same sequence would be in the counter clockwise direction. Thus, the five converter arms and the five phase terminals of the embodiment of FIG. 2A are in the ring arranged in the (clockwise or counter clockwise) sequence of:

1) the phase terminal $x_3$ of the third phase of the three-phase AC system 10a,
2) the first converter arm 5a of the five converter arms,
3) the phase terminal $x_2$ of the second phase of the three-phase AC system 10a,
4) the second converter arm 5b of the five converter arms,
5) the phase terminal $x_1$ of the first phase of the three-phase AC system 10a,
6) the third converter arm 5c of the five converter arms,
7) the phase terminal $y_1$ of the positive conductor of the single-phase AC system 10b (or the phase terminal $y_2$ of the negative conductor if the polarity of the single-phase AC system is reversed),
8) the fourth converter arm 5d of the five converter arms,
9) the phase terminal $y_2$ of the negative conductor of the single-phase AC system 10b (or the phase terminal $y_1$ of the positive conductor if the polarity of the single-phase AC system is reversed), and
10) the fifth converter arm (5e) of the five converter arms.

Figure 2B:
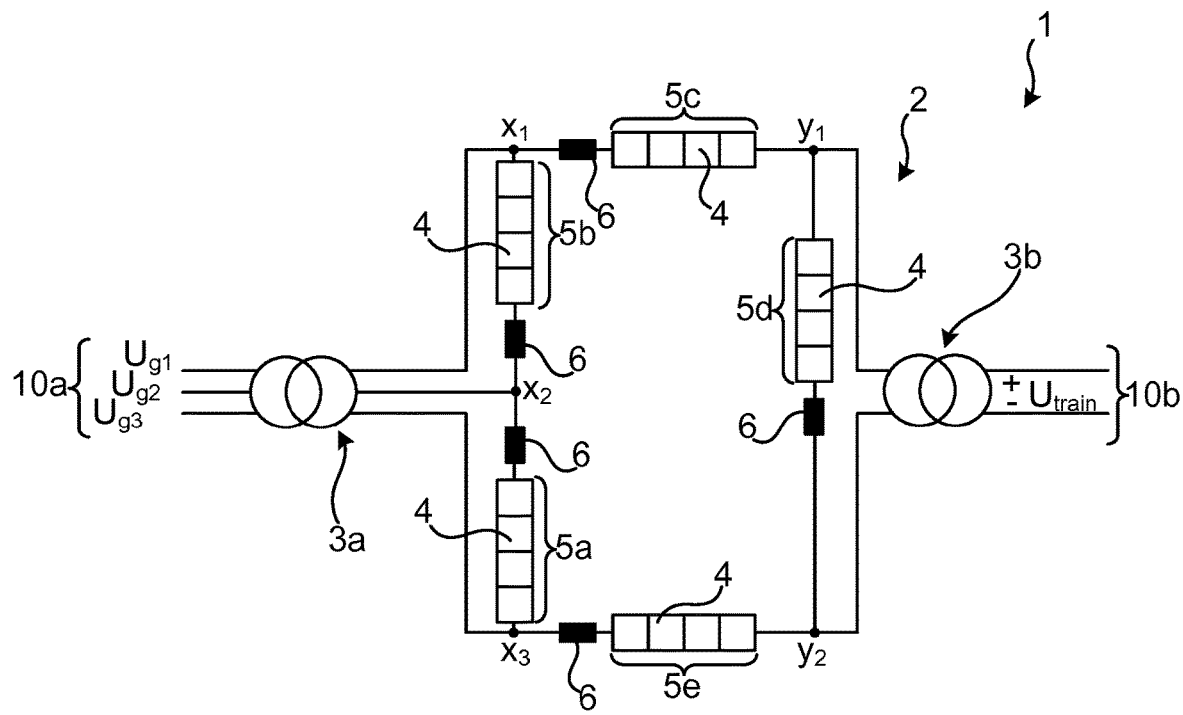
FIG. 2B is a schematic circuit diagram of an MMC topology for a three-phase to single-phase converter, with the single-phase system connected via a transformer, in accordance with some embodiments of the present invention.

FIG. 2B illustrates another embodiment of the MMC arrangement 1. The MMC arrangement 1 is as discussed in relation to FIG. 2A but here the MMC 2 is connected to the single-phase system 10b via a second (single-phase) transformer 3b. By means of the second transformer 3b, the single-phase system 10b may not need to be grounded.

Figure 2C:
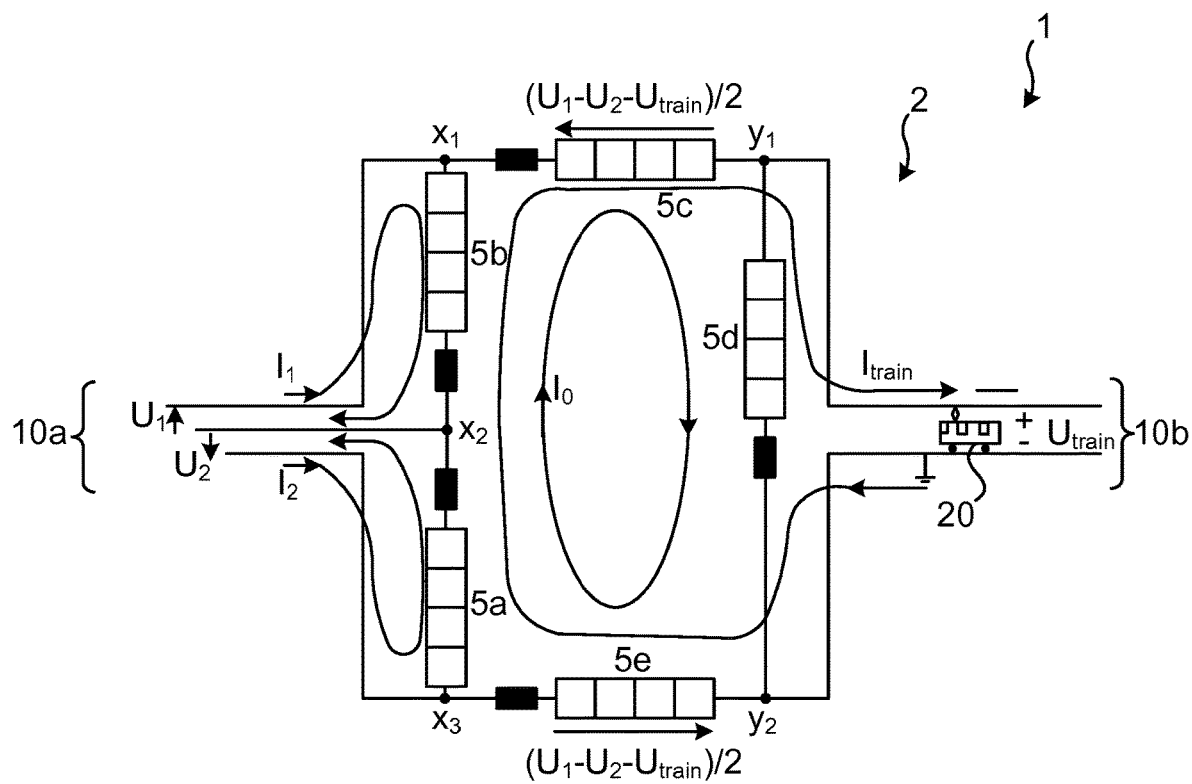
FIG. 2C is a schematic circuit diagram of an MMC topology for a three-phase to single-phase converter, e.g., as in FIG. 2A or 2B, in which current paths are schematically illustrated, in accordance with some embodiments of the present invention.

FIG. 2C illustrates current paths within some embodiments of the MMC 2, e.g., of the MMC of any of the FIGS. 2A and 2B. The first converter arm 5a is connected between the third phase terminal $x_3$ and the second phase terminal $x_2$, resulting in a voltage $U_2$ across it and a current $I_2$ through it as indicated by the arrows in a current path from the third phase to the second phase via the first converter arm 5a, where $U_2=U_{c3}-U_{c2}$. The second converter arm 5*b* is connected between the first phase terminal $x_1$ and the second phase terminal $x_2$, resulting in a voltage $U_1$ across it and a current $I_1$ through it as indicated by the arrows in a current path from the first phase to the second phase via the second converter arm 5*b*, where $U_1=U_{c1}-U_{c2}$.

The fourth converter arm 5*d* is connected between the positive phase terminal $y_1$ and the negative phase terminal $y_2$, resulting in a voltage across the fourth converter arm 5*d* equal to the difference in potential between the positive and negative phase terminals $y_1$ and $y_2$. The current $I_{train}$ of the single-phase system 10*b* flows however in a current path as indicated by the arrows through the other four converter arms 5*e*, 5*a*, 5*b* and 5*c*. This implies that the first and second converter arms 5*a* and 5*b* carry currents of both the three-phase system 10*a* and the single-phase system 10*b*, typically of different frequencies.

The third converter arm 5*c* and the fifth converter arm 5*e* may be regarded as internal arms, which in the embodiment of FIG. 2C each has a voltage of $(U_1-U_2-U_{train})/2$ across it, but in opposite directions as indicated by the arrows.

The voltages and currents of the three-phase side may be described as:

$$U_1(t)=U_{in} \cdot \cos(\omega_{in} t) \quad (1)$$

$$U_2(t)=U_{in} \cdot \cos(\omega_{in} t+\theta_1) \quad (2)$$

$$I_1(t)=I_{in} \cdot \cos(\omega_{in} t-\varphi_1) \quad (3)$$

$$I_2(t)=I_{in} \cdot \cos(\omega_{in} t+\theta_1-\varphi_1) \quad (4)$$

The voltage and current of the single-phase side may be described as:

$$U_{train}(t)=U_{out} \cdot \cos(\omega_{out} t+\theta_2) \quad (5)$$

$$I_{train}(t)=I_{out} \cdot \cos(\omega_{out} t+\theta_2-\varphi_2) \quad (6)$$

$U_{in}$ is the amplitude of each of $U_1$ and $U_2$, $I_{in}$ is the amplitude of each of $I_1$ and $I_2$, $U_{out}$ is the amplitude of $U_{train}$, $I_{out}$ is the amplitude of $I_{train}$, $\omega_{in}$ is the three-phase frequency and $\omega_{out}$ is the frequency of the single-phase system. For given three-phase and single-phase voltages (usually pre-determined), a desired power transfer P and power factors at the three-phase and single-phase sides will determine the magnitudes of the three-phase and single-phase currents. Out of the five arms 5 of the converter 2, the first and second arms 5*a* and 5*b* are connected to the fixed three-phase voltages $U_1(t)$ and $U_2(t)$, the fourth arm 5*d* is connected to the fixed single-phase voltage $U_{train}(t)$, leaving the two internal arms 5*c* and 5*e* that create the voltage $[U_1(t)-U_2(t)-U_{train}(t)]/2$, with the polarity shown in FIG. 2C. For all the converter arms to be balanced, the three-phase and single-phase currents flow in the way depicted in FIG. 2C, and a circulating current $I_0$ must flow through all the arms 5 of the converter 2. This circulating current $I_o$ has the form of:

$$I_0(t)=I_{circ} \cdot \cos(\omega_{in} t+\psi_{circ}) \quad (7)$$

where $I_{circ}$ and $\theta_{circ}$ are functions of $U_{in}$, $U_{out}$, P, $\theta_1$, $\varphi_1$, and $\varphi_2$.

Figure 3:
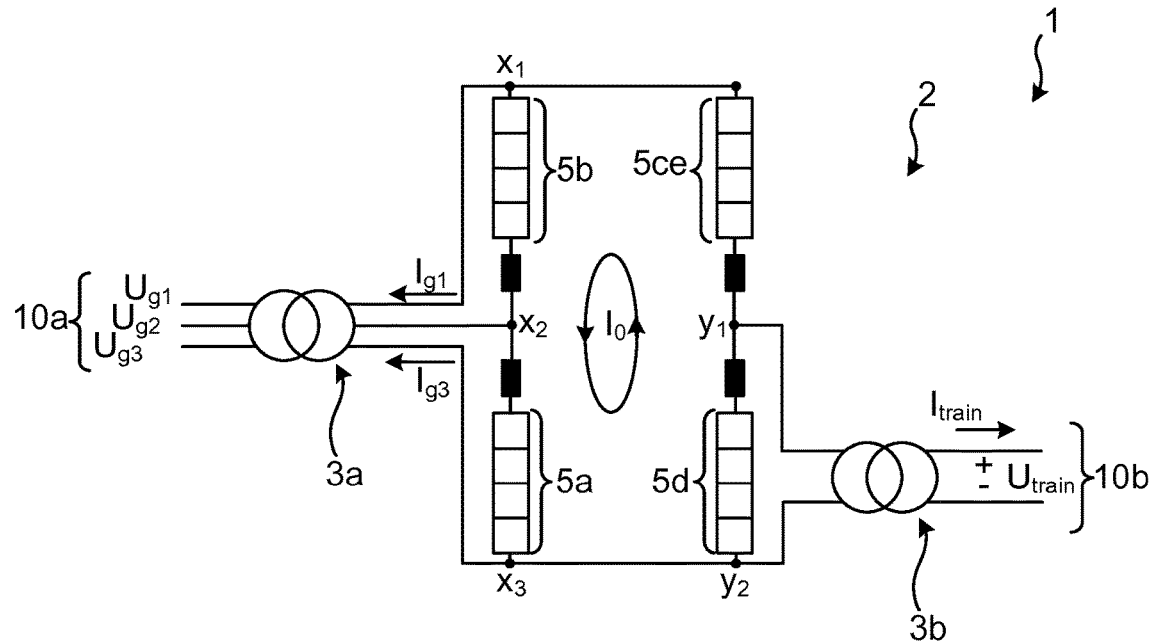
FIG. 3 is a schematic circuit diagram of another MMC topology for a three-phase to single-phase converter, in accordance with some embodiments of the present invention.

FIG. 3 illustrates a further embodiment of the suggested reduced direct MMC topology with an even further reduced number of converter arms 5, to four converter arms. In this embodiments, the two internal arms 5*c* and 5*e* of FIGS. 2A and 2B, each of which bearing a voltage of $[U_1(t)-U_2(t)-U_{train}(t)]/2$, have been merged into a single internal arm 5*ce* that bears a voltage of $U_1(t)-U_2(t)-U_{train}(t)$ located between the second and fourth arms 5*b* and 5*d* in the ring. This results in both the third phase terminal $x_3$ and the negative phase terminal $y_2$ (or positive phase terminal $y_1$ if the polarity of the single-phase system 10*b* is reversed) being located in the ring between the two neighboring first and fourth arms 5*a* and 5*d*. Alternatively, the merged internal arm 5*ce* could be located between the first and fourth arms 5*a* and 5*d*, which would result in both the first phase terminal $x_1$ and the positive phase terminal $y_1$ (or negative phase terminal $y_2$ if the polarity of the single-phase system 10*b* is reversed) being located in the ring between the two neighboring second and fourth arms 5*b* and 5*d*. It is noted that the circulating current $I_o$ is also in this embodiment circulated in the ring through all of the converter arms 5*a*, 5*b*, 5*ce* and 5*d*.

Below, the sequence in the ring formed by the converter arms and phase terminals of the embodiment of FIG. 3 is given in a clockwise direction starting from the third phase terminal $x_3$. However, it should be noted that if the same embodiment is seen from the opposite direction, the same sequence would be in the counter clockwise direction. Thus, the four converter arms and the five phase terminals of the embodiment of FIG. 2A are in the ring arranged in the (clockwise or counter clockwise) sequence of:

1) the phase terminal $x_3$ of the third phase of the three-phase AC system 10*a*,
2) the first converter arm 5*a* of the four converter arms,
3) the phase terminal $x_2$ of the second phase of the three-phase AC system 10*a*,
4) the second converter arm 5*b* of the four converter arms,
5) the phase terminal $x_1$ of the first phase of the three-phase AC system 10*a*,
6) the third (merged internal) converter arm 5*ce* of the four converter arms,
7) the phase terminal $y_1$ of the positive conductor of the single-phase AC system 10*b* or the phase terminal $y_2$ of the negative conductor if the polarity of the single-phase AC system is reversed, i.e., the phase terminal of one of the positive conductor or the negative conductor of the single-phase AC system,
8) the fourth converter arm 5*d* of the four converter arms, and
9) the phase terminal $y_2$ of the negative conductor of the single-phase AC system 10*b* or the phase terminal $y_1$ of the positive conductor if the polarity of the single-phase AC system is reversed, i.e., the phase terminal of the other of the positive conductor or the negative conductor of the single-phase AC system.

It is noted that the embodiments of FIGS. 2 and 3, having at least four converter arms, all have the following sequence in common:

1) the phase terminal $x_3$ of the third phase of the three-phase AC system 10*a*,
2) the first converter arm 5*a* of the at least four converter arms,
3) the phase terminal $x_2$ of the second phase of the three-phase AC system 10*a*,
4) the second converter arm 5*b* of the at least four converter arms,
5) the phase terminal $x_1$ of the first phase of the three-phase AC system 10*a*,
6) the third converter arm 5*c* or 5*ce* of the at least four converter arms,
7) the phase terminal $y_1$ of the positive conductor of the single-phase AC system 10*b* or the phase terminal $y_2$ of the negative conductor if the polarity of the single-phase AC system is reversed, i.e., the phase terminal of one of the positive conductor or the negative conductor of the single-phase AC system, 8) the fourth converter arm 5*d* of the at least four converter arms, and 9) the phase terminal $y_2$ of the negative conductor of the single-phase AC system 10*b* or the phase terminal $y_1$ of the positive conductor if the polarity of the single-phase AC system is reversed, i.e., the phase terminal of the other of the positive conductor or the negative conductor of the single-phase AC system.

Figure 4:
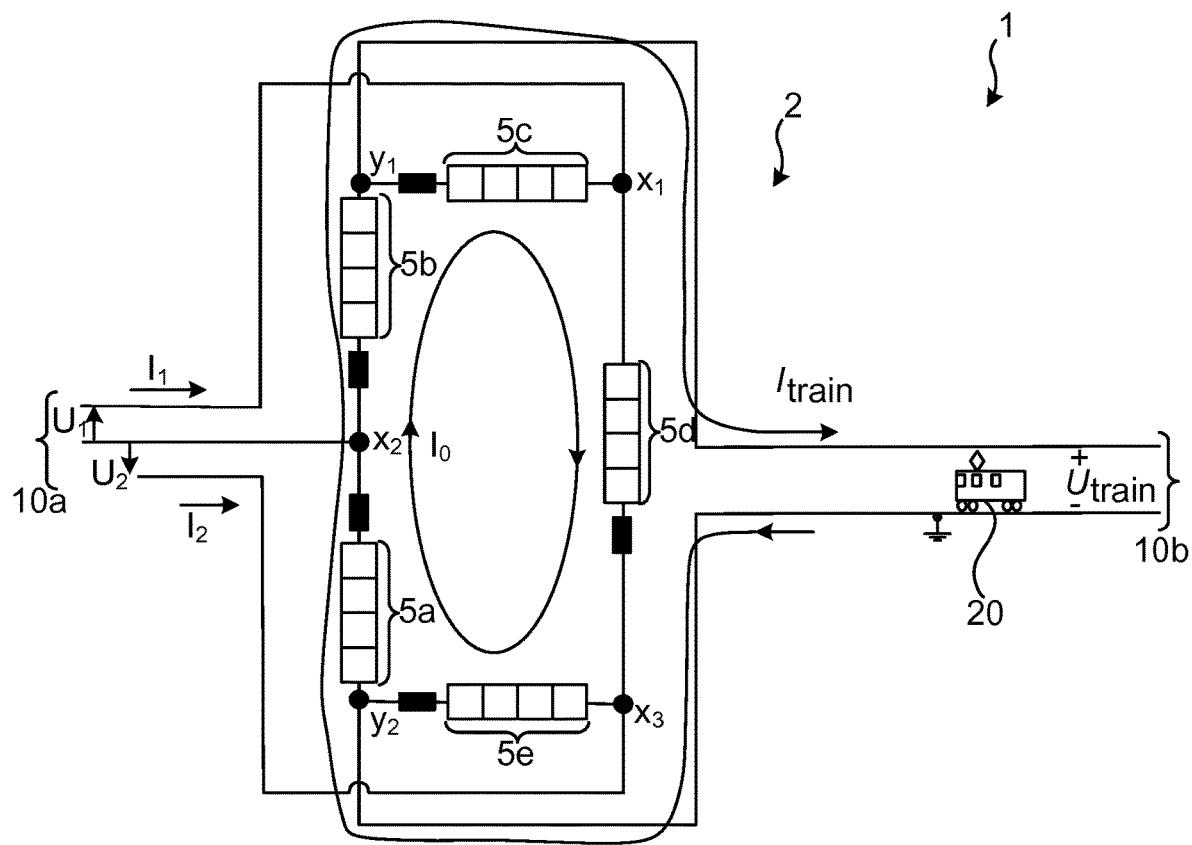
FIG. 4 is a schematic circuit diagram of another MMC topology for a three-phase to single-phase converter, in accordance with some embodiments of the present invention.

FIG. 4 illustrates another embodiment of the MMC 2 having five converter arms 5*a*, 5*b*, 5*c*, 5*d* and 5*e*, in which the converter arms are arranged in the ring as in the embodiments of FIGS. 2A, 2B and 2C, but where some of the phase terminals $x_1$, $x_2$, $x_3$, $y_1$ and $y_2$ are positioned differently in the ring, illustrating that the positioning of the phase terminals in the ring is not limiting to the invention.

Below, the sequence in the ring formed by the converter arms and phase terminals of the embodiment of FIG. 4 is given in a clockwise direction starting from the phase terminal before the first converter arm 5*a*. However, it should be noted that if the same embodiment is seen from the opposite direction, the same sequence would be in the counter clockwise direction. Thus, the five converter arms and the five phase terminals of the embodiment of FIG. 4 are in the ring arranged in the (clockwise or counter clockwise) sequence of:

1) the phase terminal $y_1$ or $y_2$ of one of the positive or negative conductors of the single-phase AC system 10*b*, 2) the first converter arm 5*a* of the converter arms, 3) the phase terminal $x_2$ of the second phase of the three-phase AC system 10*a*, 4) the second converter arm 5*b* of the converter arms, 5) the phase terminal $y_2$ or $y_1$ of the other of the positive or negative conductors of the single-phase AC system 10*b*, 6) the third converter arm 5*c* of the converter arms, 7) phase terminal $x_1$ of the first phase of the three-phase AC system 10*a*, 8) the fourth converter arm 5*d* of the converter arms, 9) the phase terminal $x_3$ of the third phase of the three-phase AC system 10*a*, and 10) the fifth converter arm 5*e* of the converter arms.

Again, it is noted that a circulating current Io is circulated in the ring through all of the converter arms also in the embodiment of FIG. 4.

Figure 5:
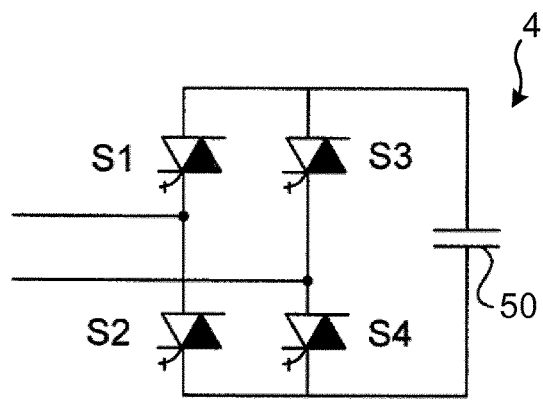
FIG. 5 is a schematic circuit diagram of a full-bridge converter cell of an MMC, in accordance with some embodiments of the present invention.

FIG. 5 illustrates a converter cell 4, here a full-bridge converter cell comprising a full-bridge topology of four semiconductor switches S1, S2, S3 and S4 connected across an energy storage 50 and allowing the cell to be bi-polar. The energy storage may typically comprise at least one capacitor.

Embodiments of the converter 2 may be used with any nominal voltages of the three-phase and/or single-phase AC systems 10*a* and 10*b*, e.g., high-voltage of at least 80 kV, but some embodiments may be especially useful with medium voltage AC systems 10*a* and/or 10*b* having a nominal voltage within the range of 1-80 kV, e.g., within the range of 15-30 kV.

The three-phase and single-phase AC systems 10*a* and 10*b* may have any, same or different (but preferably different), nominal fundamental frequency. In case, e.g., of a three-phase national distribution grid 10*a*, the nominal frequency may be 50 or 60 Hz. In case, e.g., of a single-phase railway system 10*b*, the nominal frequency may be 25 Hz (which is standard in North America), or 16.7 or 50/3 Hz (which is standard in some European countries). The circulating current $I_o$ typically has the same nominal fundamental frequency as the three-phase system 10*a*, e.g., 50 or 60 Hz, to efficiently balance the arms 5.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. An AC-to-AC modular multilevel converter (MMC) configured to be connected between a three-phase AC system and a single-phase AC system, the MMC comprising:
   a plurality of converter arms including a first converter arm, a second converter arm, a third converter arm, and a fourth converter arm, the converter arms connected in a ring to allow a circulating current to be circulated in the ring through each of the converter arms, each converter arm comprising a plurality of series-connected converter cells; and
   phase terminals arranged in the ring between the converter arms such that each of the converter arms is separated from neighboring converter arms by at least one of the phase terminals, wherein the phase terminals comprise respective terminals for each of a first phase, a second phase and a third phase of the three-phase AC system and respective terminals for each of a positive conductor and a negative conductor of the single-phase AC system.

2. The MMC of claim 1, wherein the converter arms and phase terminals are in the ring arranged in the sequence of:
   the phase terminal of the third phase of the three-phase AC system;
   the first converter arm;
   the phase terminal of the second phase of the three-phase AC system;
   the second converter arm;
   the phase terminal of the first phase of the three-phase AC system;
   the third converter arm;
   the phase terminal of one of the positive conductor or the negative conductor of the single-phase AC system;
   the fourth converter arm; and
   the phase terminal of the other of the positive conductor or the negative conductor of the single-phase AC system.

3. The MMC of claim 1, wherein the plurality of converter arms consists of four converter arms.

4. The MMC of claim 1, wherein the plurality of converter arms consists of five converter arms including a fifth converter arm.

5. The MMC of claim 4, wherein the converter arms and phase terminals are in the ring arranged in the sequence of:
   the phase terminal of the third phase of the three-phase AC system;
   the first converter arm;
   the phase terminal of the second phase of the three-phase AC system;
   the second converter arm;
   the phase terminal of the first phase of the three-phase AC system;
   the third converter arm;
   the phase terminal of one of the positive conductor or the negative conductor of the single-phase AC system;
   the fourth converter arm;
   the phase terminal of the other of the positive conductor or the negative conductor of the single-phase AC system; and
   the fifth converter arm.

6. The MMC of claim 4 wherein the converter arms and phase terminals are in the ring arranged in the sequence of:
the phase terminal of one of the positive conductor or the negative conductor of the single-phase AC system;
the first converter arm;
the phase terminal of the second phase of the three-phase AC system;
the second converter arm;
the phase terminal of the other of the positive conductor or the negative conductor of the single-phase AC system;
the third converter arm;
the phase terminal of the first phase of the three-phase AC system;
the fourth converter arm;
the phase terminal of the third phase of the three-phase AC system; and
the fifth converter arm.

7. The MMC of claim 1, wherein the three-phase AC system has a nominal frequency of 50 or 60 Hz.

8. The MMC of claim 1, wherein the single-phase AC system has a nominal frequency of 50, 60, 25, 16.7 or 50/3 Hz.

9. The MMC of claim 1, wherein the three-phase AC system has a nominal frequency of 60 Hz and the single-phase AC system has a nominal frequency of 25 Hz.

10. The MMC of claim 1, wherein the three-phase AC system has a nominal frequency of 50 Hz and the single-phase AC system has a nominal frequency of 16.7 or 50/3 Hz.

11. A system comprising:
a three-phase AC system;
a single-phase AC system;
a first power transformer; and
a modular multilevel converter (MMC) coupled between the three-phase AC system and the first power transformer, the MMC comprising:
a plurality of converter arms including a first converter arm, a second converter arm, a third converter arm, and a fourth converter arm, the converter arms connected in a ring to allow a circulating current to be circulated in the ring through each of the converter arms, each converter arm comprising a plurality of series-connected converter cells; and
phase terminals arranged in the ring between the converter arms such that each of the converter arms is separated from neighboring converter arms by at least one of the phase terminals, wherein the phase terminals comprise respective terminals for each of the three phases of the three-phase AC system and respective terminals for each of a positive conductor and a negative conductor of the single-phase AC system.

12. The system of claim 11, wherein the single-phase AC system is grounded and the MMC is connected to the single-phase AC system without a second power transformer there between.

13. The system of claim 11, further comprising a second power transformer via which the single-phase AC system is connected to the MMC.

14. The system of claim 11, wherein the single-phase AC system is a single-phase railway system.

15. The system of claim 11, wherein the three-phase AC system has a nominal frequency of 60 Hz and the single-phase AC system has a nominal frequency of 25 Hz.

16. A method of operating an electrical system, the method comprising:
applying a three-phase AC voltage to an AC-to-AC modular multilevel converter (MMC); and
receiving a single-phase AC voltage from the MMC;
wherein the MMC comprises:
a plurality of converter arms including a first converter arm, a second converter arm, a third converter arm, and a fourth converter arm, the converter arms connected in a ring so that current is circulated in the ring through each of the converter arms, each converter arm comprising a plurality of series-connected converter cells; and
phase terminals arranged in the ring between the converter arms such that each of the converter arms is separated from neighboring converter arms by at least one of the phase terminals, wherein the phase terminals comprise respective terminals receiving a first phase, a second phase and a third phase of the three-phase voltage and respective positive and negative terminals coupled receiving single-phase AC voltage.

17. The method of claim 16, wherein the three-phase AC voltage has a nominal frequency of 60 Hz and the single-phase AC voltage has a nominal frequency of 25 Hz.

18. The method of claim 16, further comprising using the single-phase voltage to power a locomotive vehicle.

19. The method of claim 16, wherein the plurality of converter arms consists of four converter arms and the converter arms and phase terminals are in the ring arranged in the sequence of:
the phase terminal of the third phase of the three-phase AC voltage;
the first converter arm;
the phase terminal of the second phase of the three-phase AC voltage;
the second converter arm;
the phase terminal of the first phase of the three-phase AC voltage;
the third converter arm;
one of the positive terminal or the negative terminal receiving the single-phase AC voltage;
the fourth converter arm; and
the other of the positive terminal or the negative terminal receiving the single-phase AC voltage.

20. The method of claim 16, wherein the plurality of converter arms consists of five converter arms and the converter arms and phase terminals are in the ring arranged in the sequence of:
the phase terminal of the third phase of the three-phase AC voltage;
the first converter arm;
the phase terminal of the second phase of the three-phase AC voltage;
the second converter arm;
the phase terminal of the first phase of the three-phase AC voltage;
the third converter arm;
one of the positive terminal or the negative terminal receiving the single-phase AC voltage;
the fourth converter arm;
the other of the positive terminal or the negative terminal receiving the single-phase AC voltage; and
a fifth converter arm.

21. The method of claim 16, wherein the plurality of converter arms consists of five converter arms and the converter arms and phase terminals are in the ring arranged in the sequence of:

one of the positive terminal or the negative terminal receiving the single-phase AC voltage;
the first converter arm;
the phase terminal of the second phase of the three-phase AC voltage;
the second converter arm;
the other of the positive terminal or the negative terminal receiving the single-phase AC voltage;
the third converter arm;
the phase terminal of the first phase of the three-phase AC voltage;
the fourth converter arm;
the phase terminal of the third phase of the three-phase AC voltage; and
a fifth converter arm.

* * * * *